United States Patent
Hertlein et al.

(10) Patent No.: US 6,639,192 B2
(45) Date of Patent: Oct. 28, 2003

(54) DEPOSITION DEVICE FOR DEPOSITING SEMICONDUCTOR MATERIAL ON A HEATED SUBSTRATE

(75) Inventors: Harald Hertlein, Burgkirchen (DE); Karl Hesse, Burghausen (DE); Axel Frauenknecht, Burghausen (DE)

(73) Assignee: Wacker-Chemie GmbH, München (DE)

( * ) Notice: Subject to any disclaimer, the term of this patent is extended or adjusted under 35 U.S.C. 154(b) by 0 days.

(21) Appl. No.: 10/042,801

(22) Filed: Jan. 9, 2002

(65) Prior Publication Data

US 2002/0088401 A1 Jul. 11, 2002

(30) Foreign Application Priority Data

Jan. 11, 2001 (DE) .......................................... 101 01 040

(51) Int. Cl.[7] .................................................. H05B 3/08
(52) U.S. Cl. ...................................................... 219/541
(58) Field of Search ............................... 219/541, 270, 219/549, 543, 444.1; 423/349; 438/482, 88; 264/81

(56) References Cited

U.S. PATENT DOCUMENTS

| | | | |
|---|---|---|---|
| 3,011,877 A | * | 12/1961 | Schweickert et al. ........ 422/199 |
| 3,147,141 A | * | 9/1964 | Ishizuka ...................... 118/724 |
| 4,141,764 A | * | 2/1979 | Authier et al. ................. 438/88 |
| 4,160,797 A | * | 7/1979 | Goppinger et al. ............ 264/81 |
| 4,248,925 A | | 2/1981 | Ambrogi |
| 4,311,545 A | * | 1/1982 | Bugl et al. ................... 117/102 |
| 4,470,063 A | | 9/1984 | Arakawa et al. |
| 5,593,465 A | | 1/1997 | Seifert et al. |
| 5,688,155 A | | 11/1997 | Lewis et al. |
| 6,238,454 B1 | * | 5/2001 | Polese et al. .................. 75/243 |
| 6,395,248 B1 | * | 5/2002 | Kim ............................ 423/349 |

FOREIGN PATENT DOCUMENTS

| | | |
|---|---|---|
| DE | 1198 787 | 8/1969 |
| DE | 23 28 303 | 1/1975 |

OTHER PUBLICATIONS

English Derwent Abstract AN. 1975–02188W[2] corresp. to DE 23 28 303 A1.
Patent Abstracts of Japan Corresponding to JP 08191096.
Patent Abstracts of Japan Corresp. to JP 05285735.
English Abstract Corresp. to DE 1198 787.

* cited by examiner

*Primary Examiner*—Teresa Walberg
*Assistant Examiner*—Vinod D. Patel
(74) *Attorney, Agent, or Firm*—Collard & Roe, P.C.

(57) ABSTRACT

A device is provided for depositing semiconductor material on a heated substrate body, having a stationary current leadthrough, which is guided through the baseplate of the deposition device. This is an electrode mount with an underside, which is arranged above the current leadthrough, and an upper side, which is connected to a carbon electrode into which a substrate body can be fitted. The carbon electrode has a thermal conductivity of >145 W/m*K and a coefficient of thermal expansion which is matched to the coefficient of thermal expansion of silicon.

7 Claims, 1 Drawing Sheet

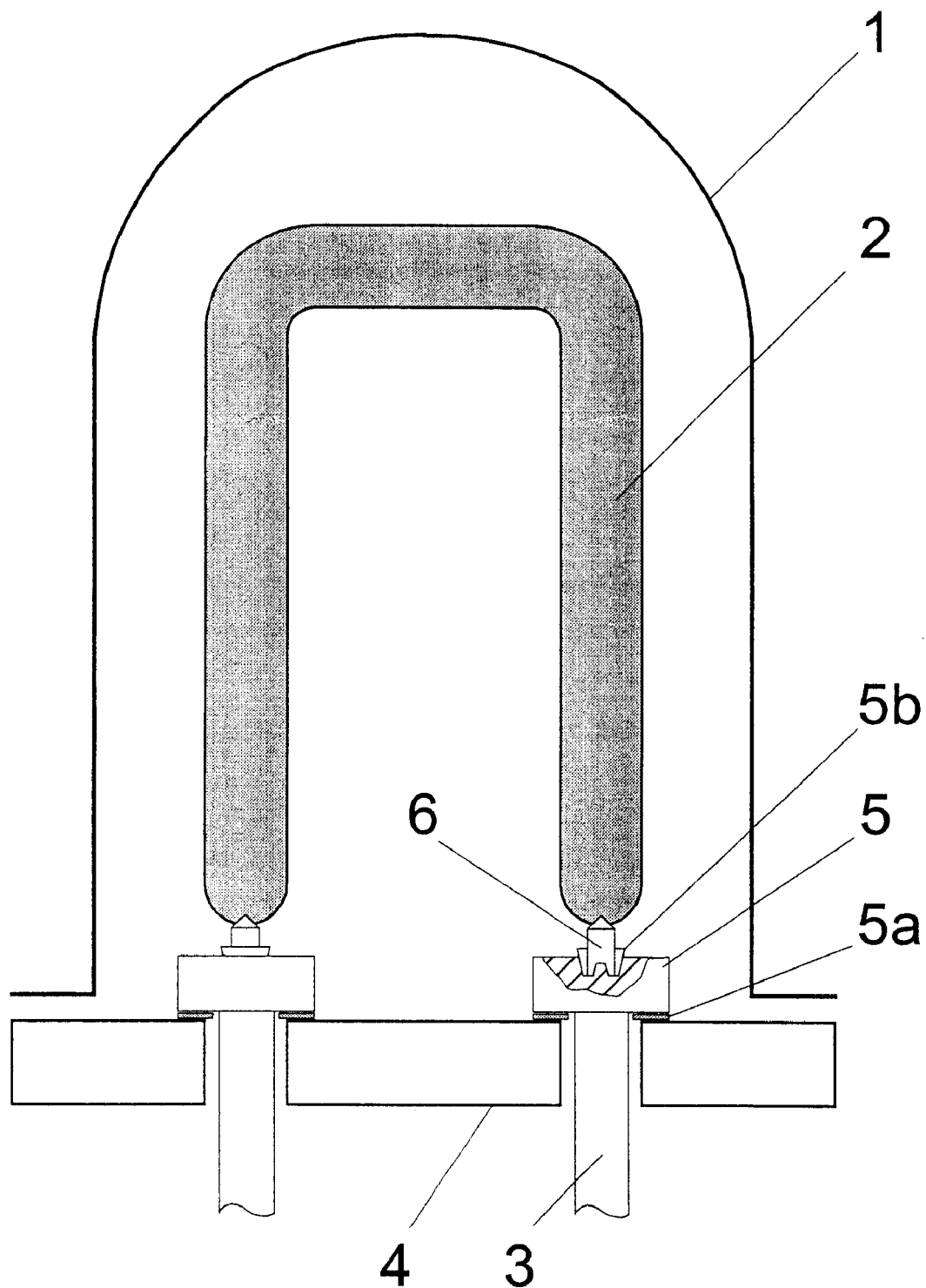

DEPOSITION DEVICE FOR DEPOSITING SEMICONDUCTOR MATERIAL ON A HEATED SUBSTRATE

BACKGROUND OF THE INVENTION

1. Field of the Invention

The invention relates to a device and a method for producing a polycrystalline silicon ingot using a carbon electrode with defined materials properties.

2. The Prior Art

High-purity polycrystalline silicon (polysilicon) as starting material for the fabrication of electronic components and solar cells is generally obtained by thermal decomposition or hydrogen reduction of a deposition gas. The deposition gas used is generally chlorosilanes, such as for example trichlorosilane. The thermal decomposition of trichlorosilane with the involvement of reducing hydrogen and with subsequent deposition of high-purity silicon on thin silicon ingots is known as the "Siemens Process". This process is used throughout the world to produce polysilicon in polysilicon deposition devices.

In their most customary embodiment, devices of this type substantially comprise a metallic baseplate and a coolable bell which is placed onto the baseplate, so that a closed reaction space is formed in the interior of the bell. It must be possible to close off the deposition device in a gastight manner, since the deposition gases are corrosive and tend to spontaneously ignite when mixed with air. The baseplate is provided with holding means which are used to hold the substrate bodies in the reaction space. The substrate bodies used are usually thin silicon ingots which are heated to the required deposition temperature by the direct passage of current. Generally, two adjacent rods are connected at their free ends, which lie opposite the secured root ends, by a bridge. Thus they form a U-shaped substrate body. The electric current is supplied through the pair of holders which are holding the ingot roots of the U-shaped substrate body.

A holder includes a current leadthrough which leads through the baseplate and is connected to a current source outside the deposition device. Inside the deposition device, the current leadthrough is designed as an electrode mount or is securely connected to a separate electrode mount. A carbon electrode which is directed into the reaction space is fitted onto the electrode mount. At the top, the carbon electrode usually has a cutout, into which the ingot root of the substrate body is fitted. The holders are designed in such a way that the secured substrate bodies are fixed and cannot be moved. The current leadthrough and, if appropriate, also the electrode mount are cooled. This prevents semiconductor material from being deposited on the holder of the substrate body.

When producing large polycrystalline silicon ingots, it is relatively frequently observed that, in the final stage of the deposition or during the cooling phase after the deposition, they tilt out of the holders. Thus, they may fall over and/or can be damaged in the region of the ingot-root ends. This phenomenon not only delays the further processing of the semiconductor bodies to form the products, which are predominantly required in the electronics industry. In addition, this may also cause considerable financial loss, since tilted silicon ingots can no longer be processed further in the manner intended.

To solve this problem, it is proposed in U.S. Pat. No. 5,593,465 to have at least one spring element, which allows the electrode mount to move relative to the current leadthrough and damps this movement. This spring element is arranged between the current leadthrough and the electrode mount. However, this solution involves considerable technical outlay and therefore substantial costs.

SUMMARY OF THE INVENTION

It is an object of the present invention to provide a device for depositing semiconductor material on a heated substrate body which substantially avoids the described drawbacks without substantial conversion work having to be undertaken on a conventional deposition device.

The above object is achieved, according to the present invention, by a deposition device having a stationary current leadthrough, which is guided through the baseplate of the deposition device. There is also an electrode mount with an underside, which is arranged above the current leadthrough, and an upper side, which is connected to a carbon electrode into which a substrate body can be fitted. The carbon electrode has a thermal conductivity of >145 W/m*K and a coefficient of thermal expansion which is matched to the coefficient of thermal expansion of silicon.

The thermal conductivity of the carbon electrode is selected to be as high as possible, in order to reduce the tensile/compressive stresses which occur in the ingot root. The thermal conductivity is preferably >145 W/m*K. The thermal conductivity is particularly preferably greater than 165 W/m*K, and it is particularly preferable for the thermal conductivity to be 170 W/m*K. The value 170 W/m*K corresponds to the carbon electrode which has the highest thermal conductivity of all types of carbon which it has so far been possible to test. This electrode has so far achieved the best result. However, it can be assumed that even better results can be achieved with a carbon electrode which has an even higher thermal conductivity.

The coefficient of thermal expansion is matched to that of polysilicon which means that it is equal to that of polysilicon. The coefficient of thermal expansion is therefore preferably between $2 \times 10^{-6}$ and $6 \times 10^{-6}$. The coefficient of thermal expansion is particularly preferably between $3.0 \times 10^{-6}$ and $3.6 \times 10^{-6}$, and it is particularly preferable for the coefficient of thermal expansion to be $3.3 \times 10^{-6}$.

Tests have shown that in most cases the breaking of the ingot root leads to the polysilicon ingots falling over. It was only possible to significantly reduce the occurrence of ingot root cracks by exchanging the standard carbon electrodes for carbon electrodes having the abovementioned materials properties. The device according to the invention prevents the polycrystalline silicon ingots from falling over as a result of splintered ingot roots.

The invention also relates to a method for producing polycrystalline silicon ingots which method is carried out utilizing a device according to the invention.

In this method, in a conventional Siemens process a carbon electrode with a thermal conductivity of >145 W/m*K and a coefficient of thermal expansion matched to the coefficient of thermal expansion of silicon is used.

The invention is carried out in a way which is customary in the prior art. The substrate material used is thin silicon ingots which are heated preferably to a deposition temperature range between 900 and 1200° C. by direct passage of current. The quantities of chlorosilane used are preferably 10 to 1400 kg/h or more, and the quantities of hydrogen are preferably 10 to 800 m³/h or more. The previous prior art carbon electrode, has a thermal conductivity of 75 W/m*K and a coefficient of thermal expansion of $4 \times 10^{-6}$. The use of this prior art carbon electrode in some cases led to the ingot roots breaking. In contrast to the prior art electrode and in order to reduce the tensile/compressive stresses in the ingot root, a carbon electrode is used which has the thermal conductivity according to the invention and has the coefficient of thermal expansion according to the invention.

The method according to the invention is more economical than the conventional Siemens Process for the following reasons:

timesaving (reduced labor costs)

prevention of safety risks (fewer occupational accidents)

increase in productivity (reduction in batch change time)

increase in yield (less polysilicon waste, reduced levels of fine fragments of polysilicon)

The present invention also relates to the use of a carbon electrode having the abovementioned materials properties for the production of polycrystalline silicon.

Carbon electrodes of this type are commercially available, for example from Schunk Kohlenstofftechnik GmbH (D-35339 Giessen) or SGL Carbon Group (SGL CARBON GmbH, Ringsdorf Plant, Drachenburgstrasse 1, D-53170 Bonn).

In particular, the present invention relates to the use of a carbon electrode having a thermal conductivity of >145 W/m*K and a coefficient of thermal expansion which is matched to the coefficient of thermal expansion of silicon, for the production of polycrystalline silicon by means of the Siemens process.

BRIEF DESCRIPTION OF THE DRAWINGS

The drawing FIGURE illustrates a device of the invention.

The drawing FIGURE shows a device (1) for depositing semiconductor material on a heated substrate body (2), having a stationary current leadthrough (3), which is guided through the baseplate (4) of the deposition device (1), and an electrode mount (5) with an underside (5a), which is arranged above the current leadthrough, and an upper side (5b), which is connected to a carbon electrode (6) into which a substrate body (2) can be fitted, wherein the carbon electrode (6) has a thermal conductivity of >145 W/m*K and a coefficient of thermal expansion which is matched to the coefficient of thermal expansion of silicon.

DETAILED DESCRIPTION OF THE PREFERRED EMBODIMENT

The following example further illustrates the invention without being limitative in any manner thereof.

EXAMPLE

To produce polycrystalline silicon ingots, 14 installations with conventional graphite electrodes were employed. For comparison the same number of installations according to the invention having graphite electrodes with a thermal conductivity of 170 W/m*K and a coefficient of thermal expansion of $3.3 \times 10^{-6}$ were operated alternately in otherwise identical conditions. The deposition temperature ranged between 900 and 1200° C. The quantity of chlorosilane ranged between 10 and 1400 kg/h, and the quantity of hydrogen ranged between 10 and 800 m$^3$/h. While 15 of 98 process batches produced by means of the conventional device fell over, not a single one of 98 process batches produced by means of the device according to the invention fell over.

Accordingly, while only several embodiments of the present invention have been shown and described, it is evident that many changes and modifications may be made thereunto without departing from the spirit and scope of the invention.

What is claimed is:

1. A deposition device for depositing semiconductor material on a heated substrate body comprising a baseplate, having a stationary current leadthrough, which is guided through the baseplate of the deposition device;

an electrode mount with an underside, which is positioned above the current leadthrough, and an upper side, which is connected to a carbon electrode into which a substrate body is fitted; and wherein the carbon electrode has a thermal conductivity of >145 W/m*K and a coefficient of thermal expansion which is matched to and equal to the coefficient of thermal expansion of silicon.

2. The deposition device as claimed in claim 1, wherein the thermal conductivity of the carbon electrode is greater than 145 W/m*K.

3. The deposition device as claimed in claim 1, wherein the thermal conductivity of the carbon electrode is greater than 165 W/m*K.

4. The deposition device as claimed in claim 1, wherein the thermal conductivity of the carbon electrode is 170 W/m*K.

5. The deposition device as claimed in claim 1, wherein the coefficient of thermal expansion is between $2*10^{-6}$ and $6 \times 10^{-6}$.

6. The deposition device as claimed in claim 1, wherein the coefficient of thermal expansion is between $3.0 \times 10^{-6}$ and $3.6 \times 10^{-6}$.

7. The deposition device as claimed in claim 1, wherein the coefficient of thermal expansion is $3.3 \times 10^{-6}$.

* * * * *